Aug. 20, 1940.   A. E. SPICER   2,212,054
MULTIPLE CELL BATTERY
Filed Sept. 25, 1939    2 Sheets-Sheet 1
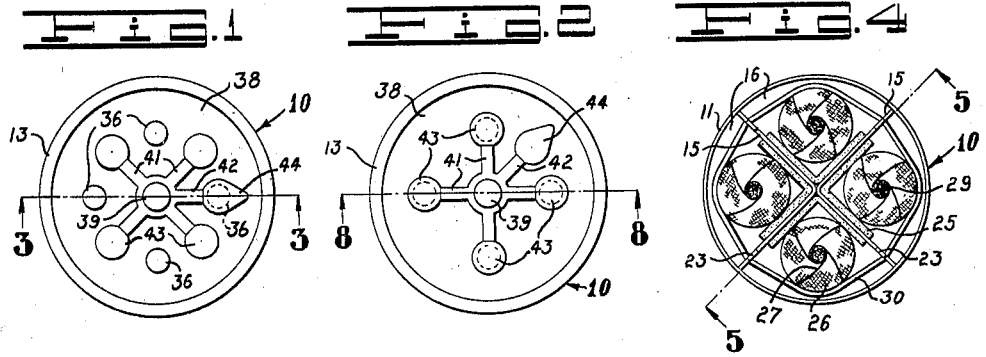
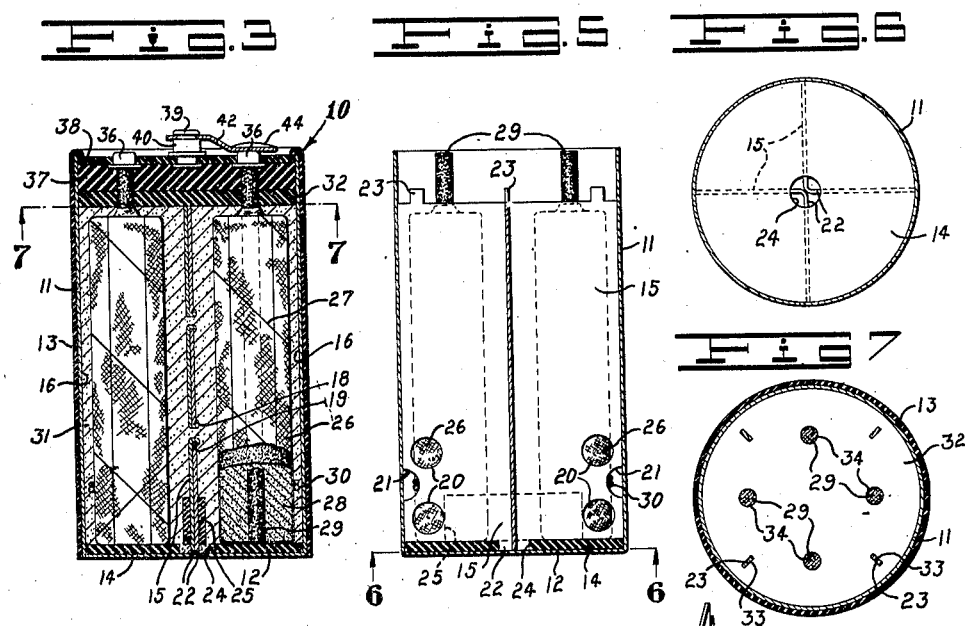
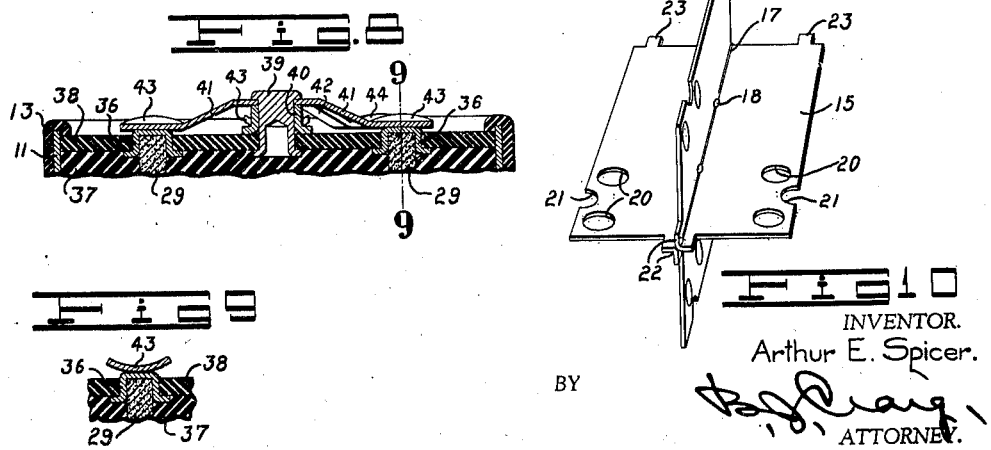
INVENTOR.
Arthur E. Spicer.
BY
ATTORNEY.

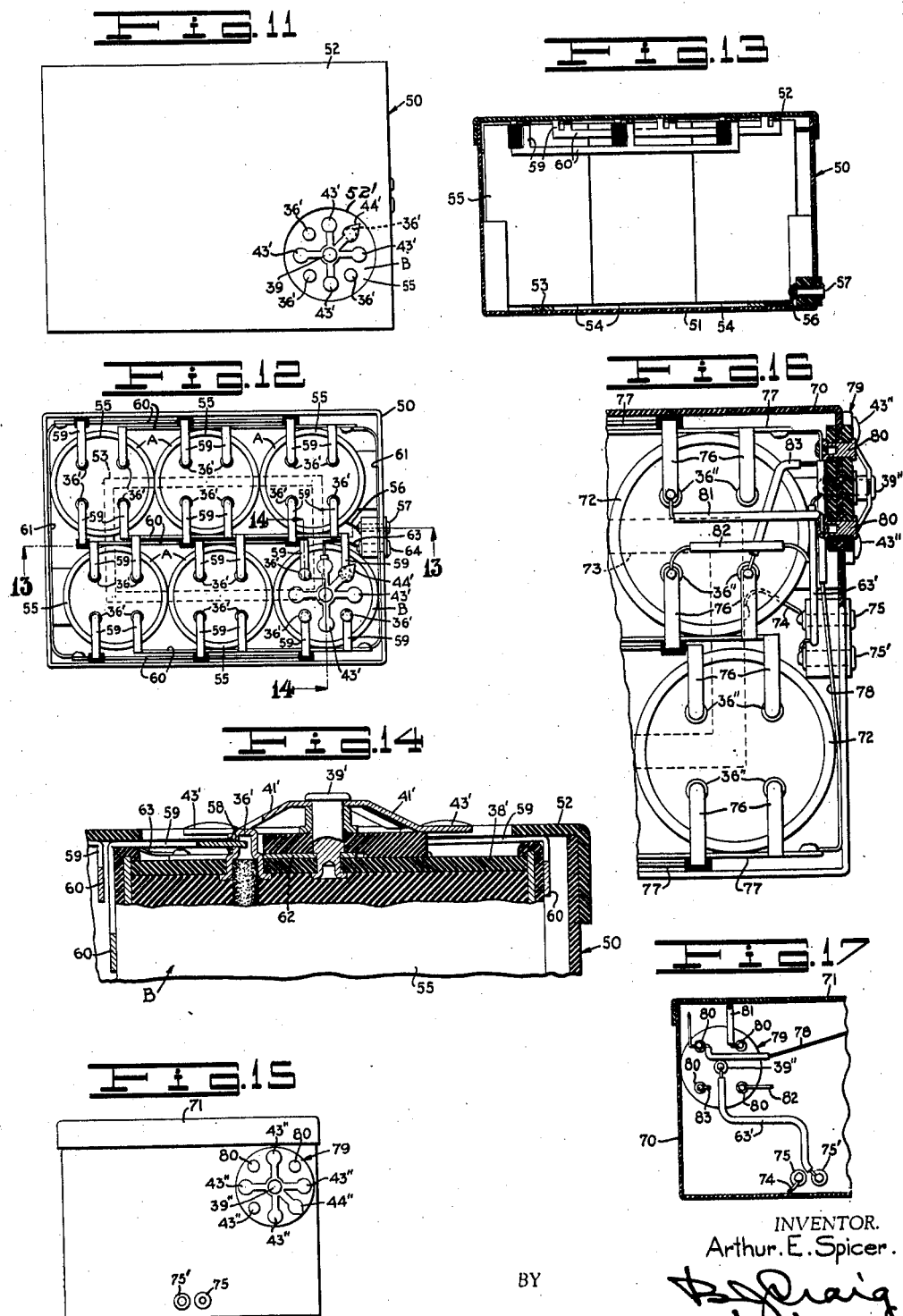

Patented Aug. 20, 1940

2,212,054

UNITED STATES PATENT OFFICE 2,212,054

MULTIPLE CELL BATTERY

Arthur E. Spicer, Pasadena, Calif.

Application September 25, 1939, Serial No. 296,435

7 Claims. (Cl. 136—108)

This invention relates to improvements in dry cell batteries.

The general object of the invention is to provide an improved dry cell.

A more specific object of the invention is to provide an improved, multiple cell dry battery including a plurality of positive poles and novel control means therefor.

Another object is to provide a multiple cell battery for applying current from one or all the positive poles at one time.

Another object of the invention is to provide an improved dry cell including a novel terminal member.

An additional object of the invention is to provide an improved multi-cell battery.

Another object of the invention is to provide a novel switch means for a multi-cell battery.

Other objects and the advantages of my invention will be apparent from the following description taken in connection with the accompanying drawings, wherein:

Fig. 1 is a top plan view of my improved dry cell battery;

Fig. 2 is a view similar to Fig. 1 showing the parts in another position;

Fig. 3 is a section taken on line 3—3, Fig. 1;

Fig. 4 is a top plan view of the battery partly assembled;

Fig. 5 is a section taken on line 5—5, Fig. 4;

Fig. 6 is a section taken on line 6—6, Fig. 5;

Fig. 7 is a section taken on line 7—7, Fig. 3;

Fig. 8 is a fragmentary section taken on line 8—8, Fig. 2 and on an enlarged scale;

Fig. 9 is a fragmentary section taken on line 9—9, Fig. 8;

Fig. 10 is a perspective view of the partition;

Fig. 11 is a top plan view of a multi-cell battery;

Fig. 12 is a view similar to Fig. 11 with the cover removed;

Fig. 13 is a section taken on line 13—13, Fig. 12;

Fig. 14 is an enlarged fragmentary section taken on line 14—14, Fig. 12;

Fig. 15 is an end view showing a modification;

Fig. 16 is an enlarged fragmentary, horizontal, sectional view; and

Fig. 17 is a sectional view of the interior of the casing with the cells removed.

Referring to the drawings by reference characters I have indicated my improved dry cell battery generally at 10. As shown the battery includes a cylindrical zinc outer casing 11 made of zinc and which is open at the top and closed at the opposite end by an integral bottom 12.

The casing 11 is preferably encased in a heavy paper or cardboard cover 13. Within the casing 11 and engaging the bottom 12 I provide a disk of insulation material 14 such as "Bakelite" or other suitable material.

Within the casing 11 above the insulating disk 14 I show a pair of longitudinal zinc partition members 15 which are arranged to form four separate chambers or cells indicated at 16.

Each of the partitions 15 includes portions arranged at right angles to each other and extending from the insulation disk 14 towards the open end of the casing 11 where they terminate a predetermined distance below the end of the casing.

As shown in Fig. 10 the adjacent portions 17 of the partitions are connected by tongues 18 on one member positioned in suitable slots 19 provided in the other member. Each of the partition members is preferably provided with apertures 20 near the edges thereof and with open ended edge slots 21 as shown.

Further each of the partition members includes a downwardly extended tongue 22 at the lower end, and a spaced upwardly directed tongue 23 at the upper end. The tongues 22 are positioned within an aperture 24 in the insulation disk 14 and engage the bottom 12 of the casing 11.

In each of the cells 16 I provide insulating strips of felt 25 or other suitable material 16 which covers the inner part of the lower portions of the faces of the partition members 15.

A thin covering of matted felt 26 or similar material is suitably secured in place as by threads 27 and serves as a receptacle for a depolarizing composition 28. A carbon rod 29 is centrally arranged in the composition 28 in each of the cells 16 forming a positive pole assembly for each individual cell.

In each cell the lower end of the covering 26 around the depolarizing composition 28 and rod 29 is supported on the insulation disk 14 and is suitably secured against the strips 25 as by rubber bands 30 or in other suitable manner. The bands 30 engage the open ended slots 21 in the partitions 15.

The remainder of each of the cells 15 about the positive pole member is filled with a suitable dry cell electrolyte 31. The apertures 20 and open ended slots 21 form passages through which the electrolyte may freely pass from one cell 16 to another.

A disk of insulation material 32 such as cardboard or fiber is positioned within the casing 11 over the end of the partitions 15. The insulation material 32 preferably includes slots 33

(see Fig. 7) which receive the tongues 23 on the upper end of the partitions 15. Further the insulation material includes apertures 34 to receive the ends of the rod 29 which protrude a predetermined length from the coverings 26 and cells 16. The protruding end of each rod 29 is preferably provided with a metallic contact cap 36.

The space in the casing 11 above the insulation disk 32 is partially filled with wax 37 or the like and the remainder of the casing is covered with "Bakelite" 38 or other suitable material flush with the end of the casing.

Centrally arranged on top of the casing 11 and fixed in the covering 38 I provide a metal terminal post 39 which includes a sleeve 40 on which a plurality of arms 41 pivotally rotate.

As shown in Figs. 1 and 2 the arms 41 are five in number, four of which are spaced at 90° intervals and the fifth is arranged midway between two of the arms as at 42. Each of the arms 41 includes a cupped end portion 43 with the arm 42 terminating in the shape of an arrow 44.

Each of the cupped portions 43 is equidistant from the central post 39 and radially aligned with the contact caps 36 on the ends of each of the bars 28.

A battery 10 may be used in the common flashlight casing or for any other duty. In operation the arm 42 with the arrow 44 is positioned so as to engage one of the contact caps 36. The battery is then ready for use in the usual manner.

When the cell 16 associated with the arm 42 becomes weak or exhausted, the operator removes the battery from the flashlight casing and by turning the arm 42 in either direction the arrow 44 is brought into engagement with the second contact cap 36.

When the second cell 16 associated with the arm 42 becomes weak or exhausted, the operator removes the battery and again turns the arm 42 bringing the arrow 44 into engagement with the third contact cap 36 and when this cell 16 is exhausted, the arm 42 is again turned bringing the arrow 44 into engagement with the fourth contact cap 36.

After the fourth or last cell 16 has been exhausted the arm 42 is moved to a point midway between two of the cells 16 thus bringing the cupped portions 43 of each arm 41 into engagement with a contact cap 36. In this manner current may be drawn from all four of the cells 16.

Should the operator wish a single life high amperage battery, the arm 42 on a fresh battery may be placed midway between two of the cells 16 so that the upper end portions 43 on each of the arms 41 engages a contact cap 36.

In Figs. 11, 12, 13 and 14 I show a plurality of dry cells similar to those previously described and arranged in a series in a carton 50 which includes a bottom 51 and a lid 52 having an opening 52'. The carton is made of insulating material and in its bottom I arrange a rectangular metal contact frame 53 which engages the bottoms 54 of each of the dry cells 55. The contact frame 53 is connected by a lead 56 with a receptacle 57 which is adapted to receive one prong of a plug connector.

Each of the dry cells 55 is similar to the dry cell 10 previously described and includes a plurality of independent cells formed by partitions which include apertures so that the cells communicate. Each cell 55 has a plurality of contacts 36', which are similar to the contacts 36. As shown in Fig. 12, the central post 39 and arms 41 are omitted from the dry cells A, while the cell B is provided with a post 39' and a plurality of pivoted arms 41' (see Fig. 14). In cell B the contacts 36' are extended above the cover 38' and are slotted as at 58 to receive fingers 59 of contact strips 60. Each of the contact strips 60 is connected in series to a terminal of each of the dry cells A with the contact strips connected at the ends of the carton 50 by suitable conductor members 61. Current is carried to the contact strips 60 from the contacts 36' by the fingers 59 which are secured to the contacts 36' as by soldering them thereto.

The post 39' on dry cell B engages an electrical conductor 62 to which a wire lead 63 is connected with the lead 63 connected to a receptacle 64 which in conjunction with the receptacle 57 is adapted to receive the prongs of a plug connector.

In use when the contacts 43' on the arms 41' are in the position shown in Fig. 12, current will be drawn from one cell in each of the dry cells 55 since only a prong 44' between two of the arms 41' engages a contact 36' or cell B. When, however, the contacts are rotated 45° from the position shown in Fig. 12, current will be drawn from all of the cells of the dry cells A and B.

In Figs. 15, 16 and 17 I show a modification wherein a carton 70 having a lid 71 is provided with a plurality of dry cells 72 similar to the cells A previously described. The carton has a contact frame 73 therein which is connected by a lead 74 with a receptacle 75 which is adapted to receive one prong of a plug connector.

Each of the contacts 36" is engaged by a finger 76. The fingers on similar cells in the respective dry cells are connected in series by contact strips 77.

In the construction shown I employ a switch member 79 which includes contacts 43" mounted on fingers rotatable about the axis of a post 39" similar to the contacts 43 and post 39 previously described. The post 39" is connected by a lead 63' with a receptacle 75' which is adapted to receive one prong of a plug connector. A wire 78 connects one contact strip 77 to one of the terminals 80 of the switch 79 and another of the terminals 80 is connected by a wire 81 to one of the posts 36" of one of the dry cells 72. Another, of the terminals 80 is connected by a wire 82 to another of the posts 36" on the dry cell and still another of the terminals 80 is connected by a wire 83 to another of the posts 36" on the dry cell.

The use of the battery disclosed in Figs. 15, 16 and 17 is similar to that shown in Figs. 11 to 14 and previously described.

From the foregoing description it will be apparent that I have provided a novel dry cell battery which is simple in construction and highly efficient in use.

Having thus described my invention, I claim:

1. In a dry battery including a housing having an electrolyte therein and including a plurality of poles each having an exposed electrical contact portion thereon, said poles being spaced apart and a contact member rotatable on said housing and having contact arms thereon, said arms being arranged to simultaneously engage a plurality of said poles, said contact member further including a contact arm engageable with a single pole while the other arms are free from engagement with any pole.

2. In a dry cell battery, a hollow elongated electroactive metal casing including a plurality of independent cells, each of said cells including a projecting positive pole having a contact portion thereon, a support on said casing, a contact member rotatable on said support, spaced arms on said rotatable contact member adapted in one position to simultaneously engage all of said post contacts and in another position to be disposed between the post contacts and another arm on said rotatable contact, said other arm being disposed between a pair of the first arms and being engageable with any one of the post contacts.

3. In a dry cell battery, a hollow elongated electroactive metal casing including an open top and having a plurality of longitudinal partitions thereon, a positive pole member in each cell and an electrolyte about each pole, a terminal post centrally arranged in the open end of said casing, a plurality of terminal arms rotatable as a unit on said post, a contact portion on the end of each of said terminal arms, said posts and said arms being equally spaced, and another terminal arm between two of said first mentioned terminal arms, said second mentioned terminal arm being alignable with any one of said positive poles.

4. In a dry cell battery, a casing including a plurality of independent batteries, each battery including a plurality of cells, each of said cells including a projecting positive pole having a contact thereon, a switch including a rotatable member, and contacts adjacent to said member, each contact being connected in series with a plurality of the cell contacts, spaced arms on said rotatable member adapted in one position to simultaneously engage all of said switch contacts and in another position to be disposed between the switch contacts and another arm on said rotatable contact, said other arm being disposed between a pair of the first arms and being engageable with any one of the switch contacts.

5. In a dry cell battery, a hollow elongated electroactive metal casing including an integral bottom and an open top, a covering for said casing, an insulating disk arranged within the casing and engaging the bottom thereof, a plurality of longitudinal partitions in said casing forming a plurality of independent cells, insulating strips partially covering the lower ends of said partitions, a positive pole assembly arranged in each of said cells and including a depolarizing composition, each of said cells having an electrolytic composition therein, said partitions having apertures therethrough so that each compartment communicates with the adjacent compartment, insulating material closing the open end of said casing, a metal contact member on each pole and extending above said insulating material, a metal terminal post aligned with the axis of said casing, a plurality of arms rotatable about the axis of said post, said arms being equally spaced and each including a cupped end portion, said end portions being alignable with the ends of said contact members and another arm integral with said first arms and between a pair of the first arms, said other arm being alignable when rotated with any one of said contact members.

6. In a dry cell battery, a hollow elongated electroactive metal casing including an integral bottom and an open top, a covering for said casing, an insulating disk having an aperture therein and arranged within the casing and engaging the bottom thereof, a plurality of longitudinal partitions in said casing forming a plurality of independent cells, tongues on said partitions positioned in said aperture in said insulating disks, insulating strips partially covering the lower ends of said partitions, a positive pole assembly arranged in each of said cells and including a depolarizing composition, insulating strips separating said poles and said partitions, each of said cells having an electrolytic composition therein, said partitions having apertures therethrough so that each compartment communicates with the adjacent compartments, insulating material closing the open end of said casing, a metal contact member on each pole and extending above said insulating material, a metal terminal post aligned with the axis of said casing, a plurality of arms rotatable about the axis of said post, said arms being equally spaced and each including a cupped end portion, said end portions being alignable with the ends of said contact members and another arm integral with said first arms and between a pair of the first arms, said other arm being alignable when rotated with any one of said contact members.

7. In a battery, an insulating container having a plurality of dry cell units therein, each of said cell units including a casing having a plurality of individual cells with a contact for each individual cell, a switch member including a plurality of spaced contacts, means connecting in series similar independent cells of said cell units and the switch contacts, said switch including a circuit closer having arms, said arms being movable to simultaneously engage all of said switch contacts, another arm adapted to selectively engage any one of said switch contacts when the first arms are out of engagement with the switch contacts, a receptacle, means connecting said receptacle and said switch arms, a contact engaging the dry cell unit casings, a second receptacle and means connecting said last mentioned contact and said last mentioned receptacle.

ARTHUR E. SPICER.